(12) United States Patent
Quarmby et al.

(10) Patent No.: US 8,931,783 B2
(45) Date of Patent: Jan. 13, 2015

(54) SEAL ASSEMBLIES

(76) Inventors: Nicholas Derek Quarmby, Dubai (AE); Kjell Klintenstedt, Saltsjö-Bo (SE)

( * ) Notice: Subject to any disclaimer, the term of this patent is extended or adjusted under 35 U.S.C. 154(b) by 126 days.

(21) Appl. No.: 13/320,190

(22) PCT Filed: May 6, 2010

(86) PCT No.: PCT/GB2010/000886
§ 371 (c)(1),
(2), (4) Date: Jan. 11, 2012

(87) PCT Pub. No.: WO2010/130969
PCT Pub. Date: Nov. 18, 2010

(65) Prior Publication Data
US 2012/0098204 A1  Apr. 26, 2012

(30) Foreign Application Priority Data

May 13, 2009  (GB) .................................. 0908201.7

(51) Int. Cl.
*F16J 15/34*  (2006.01)

(52) U.S. Cl.
CPC .......... *F16J 15/3448* (2013.01); *F16J 15/3404* (2013.01); *F16J 15/346* (2013.01)
USPC ........... 277/388; 277/370; 277/371; 277/377; 277/379; 277/558

(58) Field of Classification Search
USPC .................. 277/558, 370, 371, 377, 379, 388
See application file for complete search history.

(56) References Cited

U.S. PATENT DOCUMENTS 2,452,261 A * 10/1948 Roberts .......................... 277/372
2,653,837 A * 9/1953 Voytech ......................... 277/371

(Continued)

FOREIGN PATENT DOCUMENTS

| GB | 1144382 | 3/1969 |
| GB | 2296052 | 6/1996 |
| WO | WO 2008013495 A1 * | 1/2008 |

OTHER PUBLICATIONS

European Patent Office, International Search Report in International Patent Application No. PCT/GB2010/000886 (Jul. 20, 2010).

(Continued)

*Primary Examiner* — Kristina Fulton
*Assistant Examiner* — Eugene G Byrd
(74) *Attorney, Agent, or Firm* — Leydig, Voit & Mayer, Ltd.

(57) ABSTRACT

A seal assembly for providing a seal between a pair of relatively rotatable components has; a first seal ring (30) mounted in sealing relationships, non-rotatably and for limited axial movement on a first of the components; a second seal (50) ring mounted in axially aligned relationship to the first seal ring, said second seal ring being mounted in sealing relationship, non-rotatably and for limited axial movement on a second of the components; first resilient means associated with the second seal ring urging it axially towards the first seal ring, second resilient means (40) acting on the first seal ring urging it away from the second seal ring to separate the first and second seal rings; and a centrifugal actuator (19) associated with the first seal ring, said centrifugal actuator comprising a radially extending chamber (38) between the first seal ring and the component associated therewith, said chamber being connected to a source of fluid, whereby when the components rotate relative to one another with fluid in the chamber, centrifugal pressurization of the fluid in the chamber will apply an axial load to the first seal ring urging it axially against the second resilient means and a sealing face of the first seal ring into sealing engagement with a sealing face of the second seal ring.

16 Claims, 4 Drawing Sheets

(56) References Cited

U.S. PATENT DOCUMENTS

| | | | | |
|---|---|---|---|---|
| 2,835,515 | A * | 5/1958 | Solari | 277/397 |
| 2,957,711 | A | 10/1960 | Aspelin | |
| 3,085,808 | A * | 4/1963 | Williams | 277/388 |
| 3,475,033 | A | 10/1969 | Boitik | |
| 3,515,497 | A * | 6/1970 | Gobble | 415/112 |
| 3,526,408 | A * | 9/1970 | Tracy | 277/379 |
| 3,580,587 | A * | 5/1971 | Born et al. | 277/318 |
| 3,685,839 | A | 8/1972 | Frei | |
| 3,869,135 | A * | 3/1975 | Diederich | 277/378 |
| 4,095,806 | A * | 6/1978 | Dempsey | 277/388 |
| 4,114,900 | A * | 9/1978 | Wiese | 277/364 |
| 4,408,765 | A * | 10/1983 | Adelmann, Jr. | 277/388 |
| 4,415,165 | A * | 11/1983 | Martini | 277/387 |
| 4,434,986 | A * | 3/1984 | Warner | 277/369 |
| 4,643,437 | A * | 2/1987 | Salant et al. | 277/319 |
| 4,795,169 | A * | 1/1989 | Lowe et al. | 277/397 |
| 4,846,728 | A | 7/1989 | Roman | |
| 4,884,945 | A * | 12/1989 | Boutin et al. | 415/174.2 |
| 5,149,249 | A * | 9/1992 | Schellong et al. | 277/369 |
| 5,499,901 | A * | 3/1996 | Rockwood | 415/111 |
| 6,224,061 | B1 * | 5/2001 | Roddis | 277/370 |
| 6,688,602 | B2 * | 2/2004 | Yamada et al. | 277/367 |
| 8,356,972 | B2 * | 1/2013 | Howard et al. | 415/136 |
| 2008/0111315 | A1 * | 5/2008 | Fujiwara et al. | 277/377 |
| 2008/0217862 | A1 * | 9/2008 | Feigl et al. | 277/388 |

OTHER PUBLICATIONS

European Patent Office, Written Opinion in International Patent Application No. PCT/GB2010/000886 (Jul. 20, 2010).
GB Search Report in GB0908201.7 (Sep. 14, 2009).

* cited by examiner

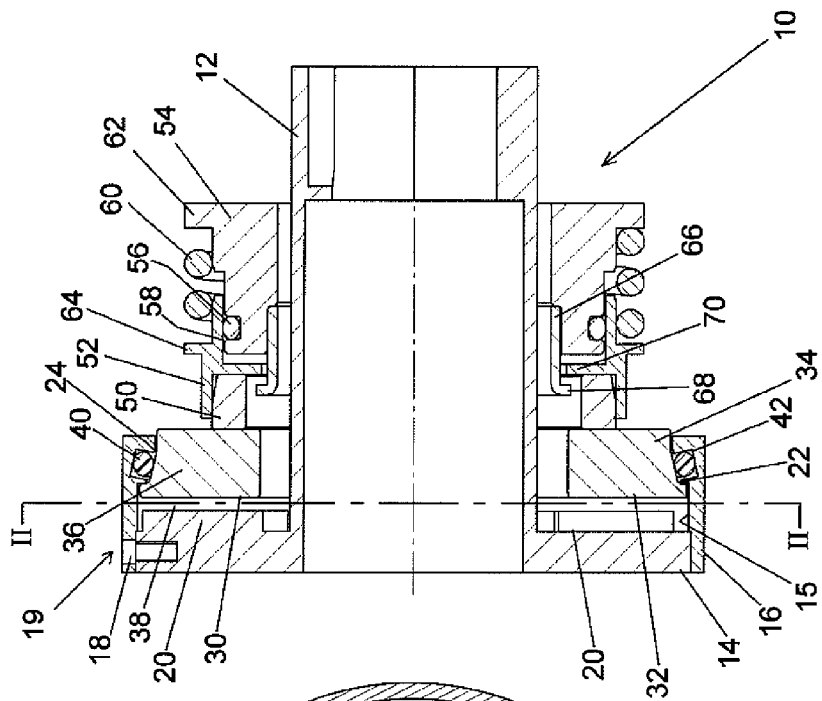
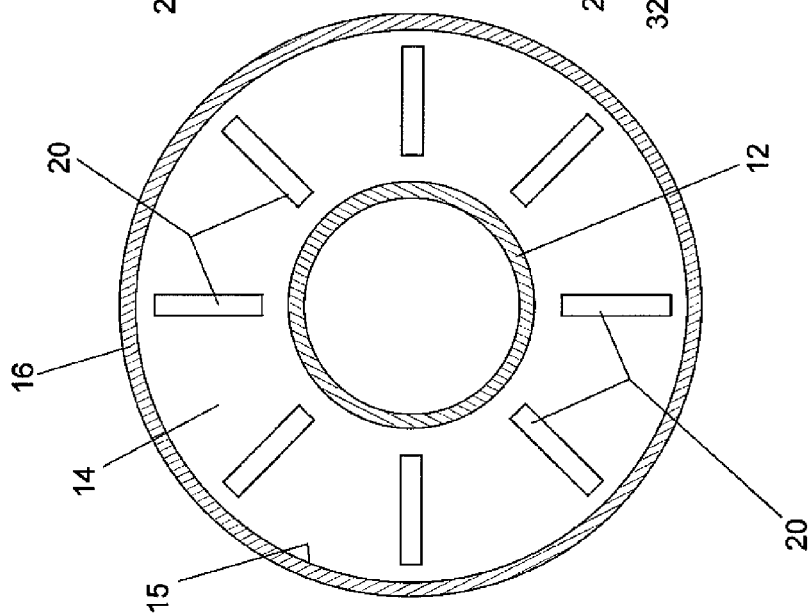

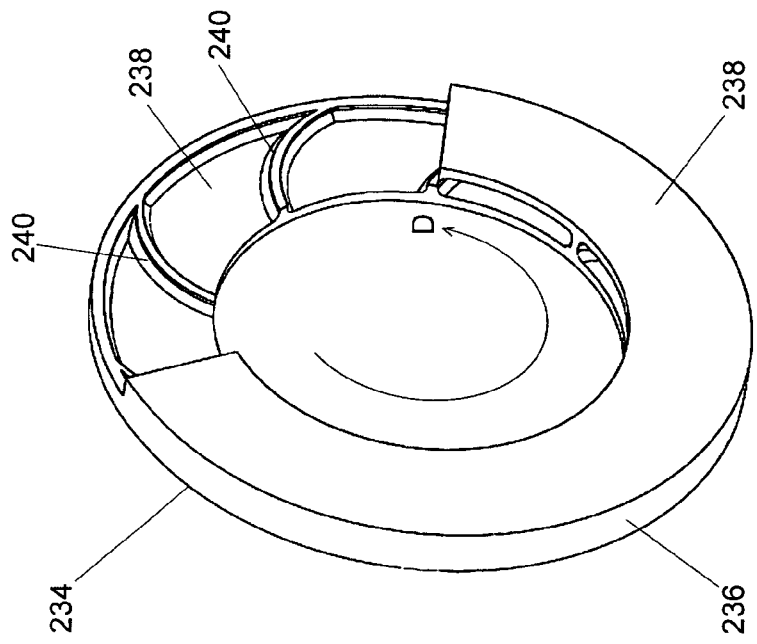
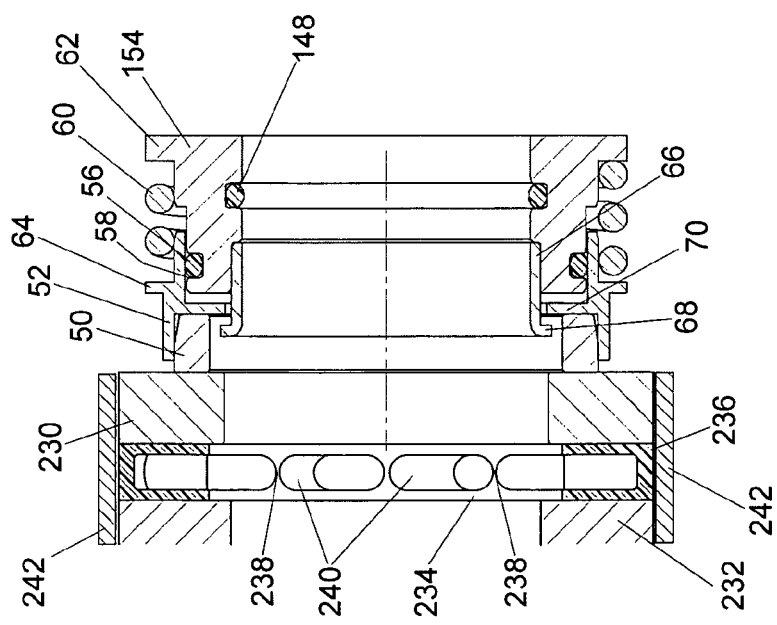
Fig 5
Fig 6

SEAL ASSEMBLIES

The present invention relates to seal assemblies and in particular to seal assemblies in which one seal ring is urged axially into sealing engagement with a second seal ring, so that sealing faces of the rings engage to form a fluid tight seal when the seal rings rotate relative to one another.

With such seals, the sealed fluid is commonly used to lubricate the sealing faces and prevent heat generation and excessive wear. This presents problems at start-up, when the seal rings begin to rotate from rest and there is no fluid in the vicinity of the sealing rings, or if the supply of fluid should fail.

One solution to this problem is to provide a barrier chamber on the outboard side of the seal, to which a barrier fluid may be supplied to provide lubrication. With such an arrangement the barrier fluid may be present when the seal is shut down or may be introduced just prior to start-up. While this solves the problem at start-up, there is always the possibility that the supply of barrier fluid may fail.

WO 2008/013495 discloses a centrifugal separator in which the sealing faces of a pair of sealing rings are resiliently biased apart and are forced into sealing engagement, by rotation of a body of liquid, when the components of the centrifugal separator rotate relative to one another. In this manner when the centrifugal separator is stationary or no liquid is present to lubricate the sealing faces, the sealing faces will be separated from one another, the sealing faces only making sealing engagement, when the components are rotating and a liquid is present to lubricate the surfaces. A problem with this arrangement is that the closing force on the sealing rings is proportional to the speed of rotation, causing excessive wear and heat generation at high speeds.

According to one aspect of the present invention a seal assembly for providing a seal between a pair of relatively rotatable components comprises; a first seal ring mounted in sealing relationship, non-rotatably and for limited axial movement on a first of the components; a second seal ring mounted in axially aligned relationship to the first seal ring, said second seal ring being mounted in sealing relationship, non-rotatably and for limited axial movement on a second of the components; first resilient means associated with the second seal ring urging it axially towards the first seal ring; second resilient means acting on the first seal ring urging it away from the second seal ring to separate the first and second seal rings; and a centrifugal actuator associated with the second seal ring, said centrifugal actuator comprising a radially extending chamber between the first seal ring and the component associated therewith; said chamber being connected to a source of fluid, whereby when the components rotate relative to one another with fluid in the chamber, centrifugal pressurisation of the fluid in the chamber will apply an axial load to the first seal ring urging it axially against the second resilient means and a sealing face of the first seal ring into sealing engagement with a sealing face of the second seal ring.

With the seal assembly defined above, when there is no relative rotation of the components or there is no fluid in the chamber defined by the actuator, then there will be no centrifugal pressurisation to urge the second seal ring towards the first and the sealing faces will be kept apart by the second resilient means acting on the second seal ring. When fluid is in the chamber defined by the actuator, the centrifugal pressurisation of the fluid will eventually overcome the load applied by the second resilient means and close the seal. The first resilient element will restrict the closing force applied by the centrifugal pressurisation, which would otherwise increase with the speed of rotation, thereby avoiding excessive wear and heat generation.

A further advantage of the present invention is that the loads applied by the second resilient means and the actuator may be selected so that the seal is closed at a predetermined rotational speed, allowing the seal to remain open at low speeds in order, for example to allow flushing of the seal.

According to a preferred embodiment of the present invention, the actuator is associated with a rotating component. Means is also preferably provided for inducing rotation of the fluid in the actuator chamber.

According to a further aspect of the present invention means may be provided to induce hydrodynamic enhancement of the centrifugal pressurisation of the actuator. For example vanes may be provided for pumping fluid towards the outer periphery of the chamber defined by the actuator, upon relative rotation of the seal rings.

The invention is now described, by way of example only, with reference to the accompanying drawings, in which:—

FIG. 1 illustrates, in sectional side elevation, one embodiment of the seal assembly in accordance with the present invention;

FIG. 2 is a sectional view along the line II-II of FIG. 1;

FIG. 5 illustrates, in sectional side elevation, a further embodiment of the seal assembly in accordance with the present invention;

FIG. 6 is a part sectional perspective view of the centrifugal actuator used in the embodiment illustrated in FIG. 5.

Figures 3, 4:
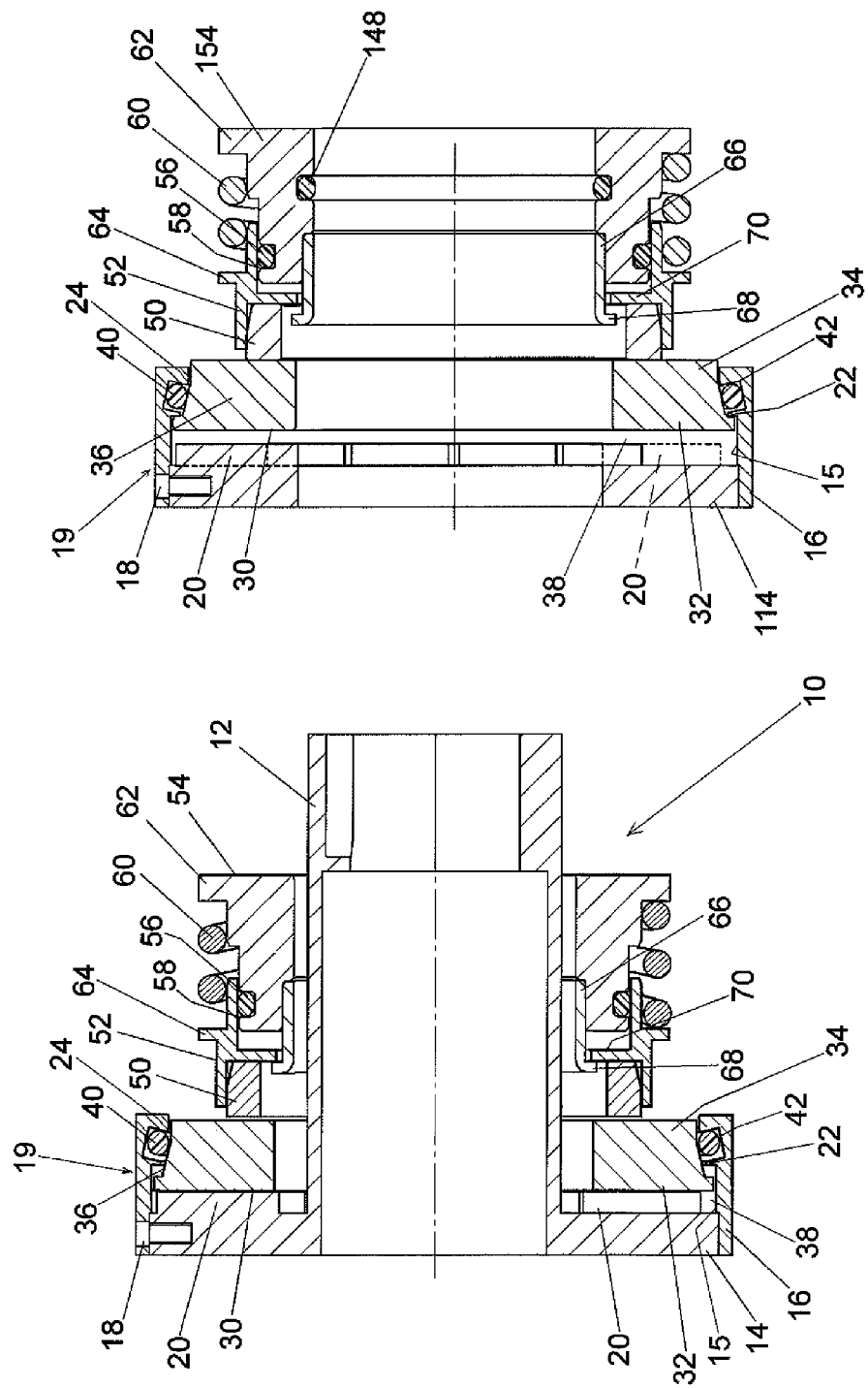
FIG. 3 illustrates, in sectional side elevation, the seal assembly shown in FIG. 1 in an open position.
FIG. 4 illustrates, in sectional side elevation, an alternative embodiment of the seal assembly in accordance with the present invention.

As illustrated in FIGS. 1 to 3 a seal assembly 10 comprises a sleeve member 12 which is adapted to be secured on and sealed with respect to a rotary component, for example a shaft, not shown. The rotary component is to be mounted for rotation through a coaxial bore in a stationary component, for example a housing or vessel (not shown), the sleeve 12 being mounted on the rotary component for rotation therewith.

A flange formation 14 is provided at one end of the sleeve 12. A ring 16 is secured in sealing relationship to the outer periphery of the flange formation 14, by a series of angularly spaced screws 18. The ring 16 extends coaxially of the sleeve 12 towards the end thereof remote from the flange formation 14 to define an axially extending recess. A series of angularly spaced radial vane formations 20 are formed on the face of the flange formation 14 exposed to the inside of ring 16.

The inner periphery of the ring 16 at the free end, that is the end remote from the flange formation 14, is stepped forming a lip formation 22 spaced inwardly of the free end. The inner surface between the lip formation 22 and free end has a frusto-conical surface 24 which decreases in diameter towards the free end. A first seal ring 30 is slidably located in the ring 16, in axially spaced relationship to the flange formation 14, to provide an annular chamber 38. The external surface of the first seal ring 30 is stepped, a first portion 32 at the end adjacent the flange formation 14 being of greater external diameter than the internal diameter of the lip formation 22; a second portion 34 at the other end of the first seal ring 30 having an external diameter less than the minimum internal diameter of ring 16; and an frusto-conical intermediate portion 36, the surface of which corresponds to the frusto-conical surface 24 of ring 16. The first seal ring 30 is thereby axially slidable in ring 16 between the flange formation 14 and the lip formation 22.

An elastomeric O-ring 40 is located in an annular groove 42 formed in ring 16 normal to the frusto-conical surface 24, the O-ring 40 engaging the frusto-conical portion 36 of first seal ring 30. When on an open position as illustrated in FIG. 3, the O-ring 40 engages the fruso-conical surface 36 of the first seal ring 30 and limits rotation between the first seal ring 30 and associated component 12.

When the seal assembly 10 is in a closed position, as illustrated in FIG. 1, the O-ring 40 is compressed between the base of the annular groove 42 and the frusto-conical portion 36 of first seal ring 30. Friction between the O-ring 40 and first seal ring 30 and between O-ring 40 and ring 16 will prevent relative rotation between first seal ring 30 and ring 16, flange formation 14, sleeve 12 and associated component.

A second seal ring 50 is mounted on a carrier ring 52 which is slidably mounted, for axial movement on a gland ring 54. The carrier ring 52 is sealed with respect to the gland ring 54 by means of an elastomeric O-ring 56 which locates in an annular groove 58 in a cylindrical surface if the gland ring 54. A helical compression spring 60 acts between a flange formation 62 on the gland ring 54 and a flange formation 64 on the outer periphery of carrier ring 52, to urge the carrier ring 52 and second seal ring 50 towards the first seal ring 30. A sleeve 66 is secured to the gland ring 54 internally of the carrier ring 52. The sleeve 66 has an outwardly directed flange formation 68 at an end spaced from the gland ring 54, for engagement of an inwardly directed flange formation 70 on the carrier ring 52. The flange formation 68 on sleeve 66 engages flange formation 70 on the carrier ring 52 to limit movement of the carrier ring 52 and second seal ring 50 towards the first seal ring 30. In addition frictional engagement between the gland ring 54 and spring 60 and between the spring 60 and carrier ring 52, will prevent relative rotation between second seal ring 50 and gland ring 54.

The gland ring 54 is adapted to be secured and sealed with respect to the stationary component, coaxially of the sleeve member 10.

The seal described above is intended to provide a seal to fluid in the inside of the sealing rings 30, 50. When the rotary component is stationary or the rotary component is rotating but there is no fluid on the inside of seal rings 30, 50, the action of the elastomeric O-ring 40 on the frusto-conical surface of portion 36 of ring 30, will urge the ring 30 towards the flange formation 14 and the sealing ring 30 out of sealing engagement with sealing ring 50, the movement of second seal ring 50 towards first seal ring 30 being restricted by engagement of flange formations 68, 70, as illustrated in FIG. 3.

However when fluid is present inside the seal rings 30 and 50, the annular chamber 38 forms a centrifugal actuator, centrifugal action forcing the fluid into the chamber 38, between the flange formation 14 and first seal ring 30, generating a pressure which will urge the first seal ring 30 towards and into sealing engagement with the second seal ring 50. The O-ring 40 provides a seal between the ring 16 and the frusto-conical surface of portion 36 of first seal ring 30. The circulation of the fluid in the chamber between flange formation 14 and first seal ring 30 and hence the centrifugal pressurisation is enhanced by the vanes 20.

The centrifugal pressurisation and the resulting closing force applied to the seal faces is proportional to the speed of rotation. However, in order to avoid excessive closing forces and consequent excessive wear, movement of the first seal ring 30 towards second seal ring 50 is limited by the lip formation 22 and the closing force on the seal rings 30, 50 is controlled by spring 60, as illustrated in FIGS. 1, 3 and 4.

In the modification illustrated in FIG. 4 a ring 114 which corresponds to the flange formation 14 of the embodiment illustrated in FIG. 1, is adapted to be mounted to a component, for example a housing or vessel which is mounted for rotation on a second stationary component, for example axle or delivery tube mounted coaxially of the first component. A ring 154 corresponding to the gland ring 54 of the embodiment illustrated in FIG. 1, is adapted to be mounted on the stationary component and sealed thereto by means of an elastomeric O-ring 148, or similar sealing means.

Otherwise the seal assembly illustrated in FIG. 4 is identical to that illustrated in FIG. 1 and functions in the same way.

In the second embodiment illustrated on FIGS. 5 and 6 a first seal ring 230 is secured to a component 232, for example a housing or vessel, which is mounted for rotation on a central stationary component, for example an axle or delivery tube not shown. The first seal ring 230 is secured to the component 232, by means of an elastomeric actuator 234, the actuator 234 being fixedly secured, for example by bonding, to radial faces of the component 232 and seal ring 230.

The elastomeric actuator 234 is moulded in one piece and has an annular elastomeric envelope 236, with axially separated walls 238 opening to its inner periphery. A series of web formations extend between the walls 238 of the envelope 236, at axially spaced locations, to form a series of vane formations 240. As illustrated in FIG. 6, the vane formations 240 are spiral, being curved so that the ends of the vane formations 240 at the inner periphery of the actuator 234, leads the ends of the vane formations 240 at the outer periphery of the actuator 234, relative to the direction of rotation D of the actuator 234. The elastomeric actuator is surrounded be a ring 242 which is mounted for rotation with the component 232.

A second seal ring 50 is mounted with respect to the central stationary component, in the manner described with respect to FIG. 4.

In this embodiment, the elastomeric actuator 234 is dimensioned axially such that when the component 232 is stationary, or is rotating without the presence of a fluid, the sealing ring 230 will be separated axially from the sealing ring 50, in the manner illustrated in FIG. 3.

However, when the component 232 rotates with fluid on the inside of the seal rings 230, 50, centrifugal action will throw fluid to the closed outer periphery of the elastomeric actuator envelope 236, generating a pressure which will cause the elastomeric actuator to expand. The ring 242 restricts radial expansion of the actuator 234, so that the actuator 234 will expand axially, forcing the seal ring 230 into sealing engagement with second seal ring 50. In addition to centrifugal pressurisation, the inclination of the vane formations 240 relative to the direction of rotation, will pump fluid into the envelope 236 further increasing the pressure therein.

When component 232 stops rotating, or fluid drains from the inside of the seal rings 230, 50, the vane formations, which are tensioned when the actuator expands axially, will draw the seal ring 230 away from second seal ring 50, to a position similar to that illustrated in FIG. 3.

Figure 7:
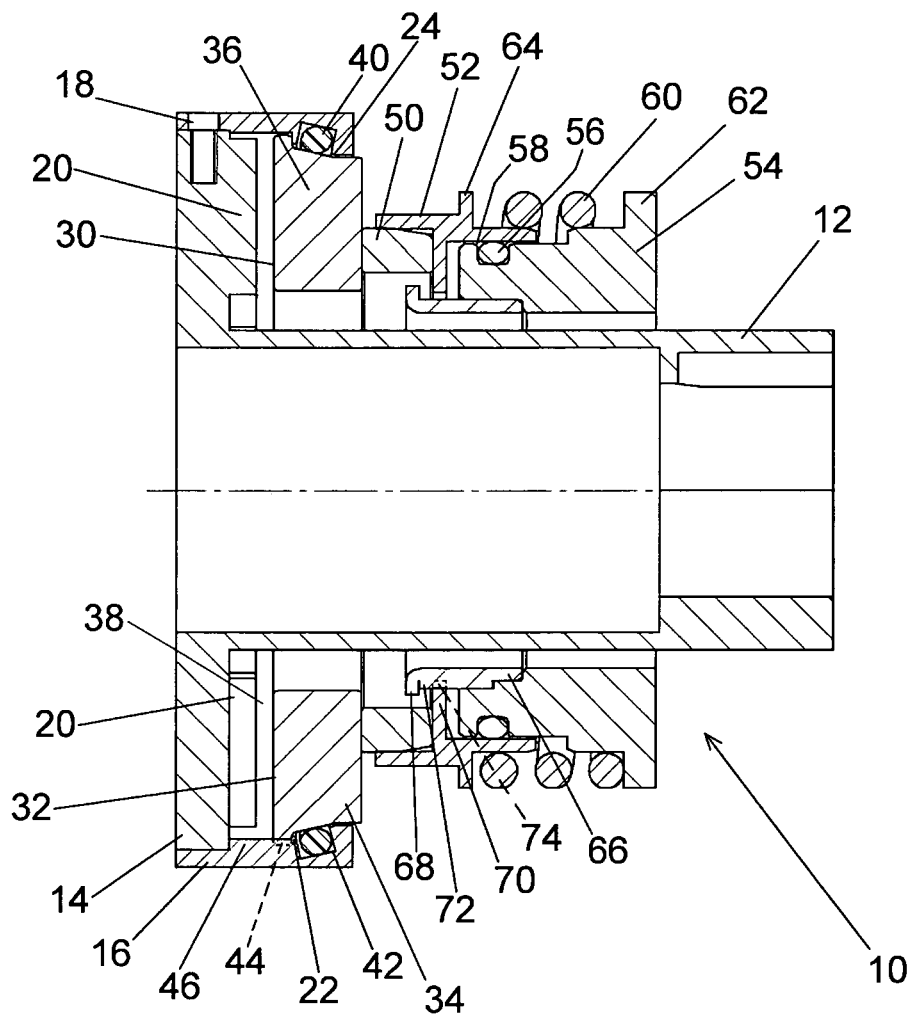
FIG. 7 illustrates modifications to the seal assembly illustrated in FIG. 1.

In the modified embodiment illustrated in FIG. 7, one or more axially extending notches 44 in portion 32 of the first seal ring 30 engage corresponding axially extending ribs 46 in the inner periphery of the larger internal diameter portion of ring 16, in order to prevent relative rotation between the first seal ring 30, the ring 16, flange formation 14, sleeve 12 and associated component, rather than relying only on friction between the first seal ring 30, ring 16 and the O-ring 40.

Furthermore, axially extending ribs 72 on the sleeve 66, engage correspondingly shaped notches 74 in flange formation 70 to prevent relative rotation between the gland ring 54 and the carrier ring 52 and second seal ring 50, rather than relying only on the frictional engagement between gland ring 54, carrier ring 52 and spring 60.

Various modifications may be made without departing from the invention. For example the vanes of the actuators illustrated in FIGS. 1 to 4 may be inclined relative to the direction of rotation, in order to induce a pumping effect which will enhance centrifugal pressurisation of the actuator. Alternatively, the vane formations 240 of the actuator 234 illustrated in FIGS. 5 and 6 may be radial so that the actuator relies only on centrifugal pressurisation. While the vanes 240 are of spiral configuration, straight vanes inclined to the direction of rotation so that the inner end will lead the outer end, may be used to induce a pumping action.

While it is preferable to mount the centrifugal actuator for rotation with the rotary component as illustrated in the above examples, the actuator may alternatively be mounted on the stationary component, provided that means, for example an impeller mounted on the rotary component, is provided to induce rotation of the body of fluid in the actuator chamber.

The invention claimed is:

1. A seal assembly for providing a seal between a pair of relatively rotatable components comprising; a first seal ring defining a seal face and mounted in sealing relationship, non-rotatably and for limited axial movement on a first of the components; a second seal ring defining a seal face and mounted in axially aligned relationship to the first seal ring, said second seal ring being mounted in sealing relationship, non-rotatably and for limited axial movement on a second of the components; first resilient means associated with the second seal ring urging it axially towards the first seal ring; second resilient means acting on the first seal ring urging it away from the second seal ring to separate the first and second seal rings; and a centrifugal actuator associated with the first seal ring, said centrifugal actuator comprising a radially extending chamber between the first seal ring and the component associated therewith, said chamber being closed at an outer periphery, an inner periphery of the chamber being open to inner peripheries of the first and second seal rings, whereby fluid present in the interior of the first and second seal rings may enter the chamber, rotation inducing means being provided whereby a body of fluid in the chamber will be induced to rotate when the components rotate relative to one another, so that centrifugal action will force the fluid towards the outer periphery of the chamber, pressurizing the fluid and applying an axial load to the first seal ring urging it axially against the second resilient means and said sealing face of the first seal ring into relatively rotating sealing engagement with said sealing face of the second seal ring.

2. A seal assembly according to claim 1 in which the centrifugal actuator is mounted for rotation with a rotary component.

3. A seal assembly according to claim 2 in which vanes are associated with the chamber of the actuator.

4. A seal assembly according to claim 1 in which one of the relatively rotatable components is stationary, the centrifugal actuator being mounted with respect to the stationary component, means being provided on the rotary component for inducing rotation of the body of fluid in the chamber of the centrifugal actuator.

5. A seal assembly according to claim 1 in which means are provided for pumping fluid into the chamber of the centrifugal actuator in order to enhance centrifugal pressurization of the centrifugal actuator.

6. A seal assembly according to claim 5 in which means for inducing rotation of the body of fluid in the chamber of the actuator comprises one or more vanes, and having ends at an inner periphery and ends at an outer periphery and being inclined, in the direction of rotation with ends of the vanes at the inner periphery leading the ends of the vanes at the outer periphery, in order to pump fluid into the chamber of the actuator.

7. A seal assembly according to claim 1 in which the actuator comprises an axially extending recess, the first seal ring being slidably located in said recess, the radially extending chamber being defined between a base of the recess and a rear face of the first seal ring, said chamber opening to the internal diameter of the first seal ring, the first seal ring being sealed with respect to the recess on its outer periphery.

8. A seal assembly for providing a seal between a pair of relatively rotatable components comprising; a first seal ring mounted in sealing relationship, non-rotatably and for limited axial movement on a first of the components; a second seal ring mounted in axially aligned relationship to the first seal ring, said second seal ring being mounted in sealing relationship non-rotatably and for limited axial movement on a second of the components; first resilient means associated with the second seal ring urging it axially towards the first seal ring; second resilient means acting on the first seal ring urging it away from the second seal ring to separate the first and second seal rings; and a centrifugal actuator associated with the first seal ring, said centrifugal actuator comprising a radially extending chamber between the first seal ring and the component associated therewith, said chamber being closed at an outer periphery, an inner periphery of the chamber being open whereby a fluid may be introduced into the chamber, rotation inducing means being provided whereby a body of fluid in the chamber will be induced to rotate when the components rotate relative to one another, so that centrifugal action will force the fluid towards the outer periphery of the chamber, pressurizing the fluid and applying an axial load to the first seal ring uring it axially against the second resilient means and a sealing face of the first seal ring into sealing engagement with a sealing face of the second seal ring, and in which the actuator comprises an axially extending recess, the first seal ring being slidably located in said recess, the radially extending chamber being defined between a base of the recess and a rear face of the first seal ring, said chamber opening to the internal diameter of the first seal ring, the first seal ring being sealed with respect to the recess on its outer periphery, and in which an elastomeric O-ring is located in an axial groove in an outer peripheral wall of the axially extending recess, the O-ring sealingly engaging in a frusto-conical surface on the outer periphery of the first seal ring, the frusto-conical surface decreasing in diameter away from the base of the recess, whereby the O-ring will apply an axial load to the first seal ring, urging the first seal ring towards the base of the recess and away from the second seal ring.

9. A seal assembly for providing a seal between a pair of relatively rotatable components comprising; a first seal ring mounted in sealing relationship, non-rotatably and for limited axial movement on a first of the components; a second seal ring mounted in axially aligned relationship to the first seal ring, said second seal ring being mounted in sealing relationship non-rotatably and for limited axial movement on a second of the components; first resilient means associated with the second seal ring urging it axially towards the first seal ring; second resilient means acting on the first seal ring urging it away from the second seal ring to separate the first and second seal rings; and a centrifugal actuator associated with the first seal ring, said centrifugal actuator comprising a radially extending chamber between the first seal ring and the component associated therewith, said chamber being closed at an outer periphery, an inner periphery of the chamber being open whereby a fluid may be introduced into the chamber, rotation inducing means being provided whereby a body of fluid in the chamber will be induced to rotate when the components rotate relative to one another, so that centrifugal action will force the fluid towards the outer periphery of the chamber, pressurizing the fluid and applying an axial load to the first seal ring urging it axially against the second resilient means and a sealing face of the first seal ring into sealing engagement with a sealing face of the second seal ring, and in which the centrifugal actuator comprises an elastomeric element secured between adjacent radial faces of the first seal ring and the component associated with the first seal ring, the elastomeric element defining an annular envelope opening to the inner periphery, whereby centrifugal pressurization of the envelope will cause it to expand axially urging the first seal ring into sealing engagement with the second seal ring.

10. A seal assembly according to claim 9 in which the envelope is defined by a pair of side walls, the side walls being interconnected by a plurality of web formations, the web formations being tensioned upon axial expansion of the actuator, whereby an axial restoring force is applied to the first seal ring to urge it away from the second seal ring when centrifugal pressurization is removed.

11. A seal assembly according to claim 1 in which the pressurization of fluid in the centrifugal actuator due to centrifugal action is balanced with the load applied by the second resilient means acting on the first seal ring, whereby the first seal ring is moved into sealing engagement with the second seal ring at a predetermined speed of rotation.

12. A seal assembly according to claim 1 including means limiting axial movement of said first seal ring toward said second seal ring.

13. A seal assembly according to claim 1 further comprising a sleeve member adapted to be secured on and sealed with respect to a rotary component, said first seal ring, a ring secured in sealing relationship to an outer periphery of said sleeve member, wherein said first seal ring is mounted on said sleeve within said ring for limited axial movement relative thereto, and said second resilient means acts between said ring secured to said sleeve and said first seal ring to urge said first seal ring away from said second seal ring.

14. A seal assembly according to claim 13 wherein said sleeve includes a flange formation secured in sealing relation to the end of said sleeve in axially spaced relation to said first seal ring to define an axially extending recess, said flange includes a series of angularly spaced radial vane formations exposed inside said recess, rotation of said flange in the presence of fluid causing centrifugal action forcing fluid into the chamber between said flanges and said first seal ring.

15. A seal assembly according to claim 14 further comprising means limiting axial movement of said first seal ring toward said second seal ring.

16. A seal assembly according to claim 15 wherein said means limiting axial movement includes a lip formed on said ring secured to said flange.

* * * * *

UNITED STATES PATENT AND TRADEMARK OFFICE
CERTIFICATE OF CORRECTION

PATENT NO. : 8,931,783 B2  
APPLICATION NO. : 13/320190  
DATED : January 13, 2015  
INVENTOR(S) : Quarmby et al.

Page 1 of 1

It is certified that error appears in the above-identified patent and that said Letters Patent is hereby corrected as shown below:

In the Claims

Claim 8 at column 6, line 38, "uring" should read -- urging --.

Signed and Sealed this  
Sixteenth Day of June, 2015

Michelle K. Lee  
*Director of the United States Patent and Trademark Office*